United States Patent Office 3,444,180
Patented May 13, 1969

3,444,180
OXDIAZOLE COMPOUNDS
Erwin Maeder, Aesch, Basel-Land, and Adolf Emil Siegrist, Basel, Switzerland, assignors to Ciba Limited, Basel, Switzerland, a company of Switzerland
No Drawing. Filed Sept. 21, 1966, Ser. No. 581,161
Claims priority, application Switzerland, Oct. 4, 1965, 13,644/65
Int. Cl. C07d 87/52, 7/24
U.S. Cl. 260—307                4 Claims

ABSTRACT OF THE DISCLOSURE

New 7-oxdiazolyl-coumarin compounds are provided which may be represented by the formula

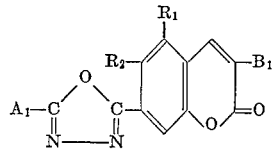

wherein $A_1$ and $B_1$ each represents an aromatic-carbocyclic or aromatic-heterocyclic residue or an aralkenyl radical, and $R_1$ $R_2$, and $R_3$ each represents hydrogen, lower alkyl or lower alkoxy.

The compounds of this invention are especially useful as optical brighteners for organic materials.

---

The present invention provides new valuable oxdiazole compounds all of which are characterized by the common structural feature of a 7-oxdiazolyl-coumarin of the formula (1a)

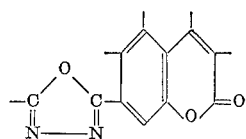

in which at least one of the positions 3 or 5' carries an aromatic substituent and which may further contain any desired non-chromophoric substituents, as well as processes for the manufacture and use of these compounds for optically brightening a wide variety of organic substrates.

As coumarins of this type there may be mentioned primarily those compounds in which aromatic substituents take up positions 3 and 5', that is to say that the present invention is predominantly concerned with oxdiazole compounds of the formula (1b)

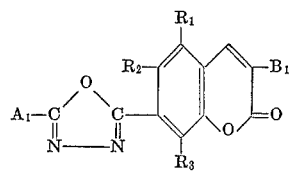

in which $A_1$ and $B_1$ each represents an aromatic-carbocyclic or aromatic-heterocyclic residue or an aralkenyl radical, and $R_1$, $R_2$ and $R_3$ each represents hydrogen, a lower alkyl group or a lower alkoxy group.

Of special value among the oxdiazole compounds as defined above are those of the formula (2)

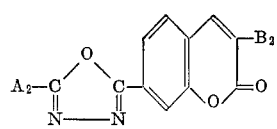

where $A_2$ represents a residue from the series phenyl, naphthyl, stilbenzyl, styryl, 2-thienyl, pyridyl, 6-benzazolyl, 7-coumaryl, and $B_2$ a residue from the series phenyl, 2-thienyl, pyridyl, 2-furoyl, and in which the phenyl, naphthyl and thienyl residues mentioned under $A_2$ and $B_2$ may contain further substituents from the series alkyl, alkoxy, hydroxyl, amino, halogen, phenyl, carboxyl, carboxylic acid ester or amide, nitrile groups, sulphonic acid ester or amide groups, or sulphinic acid ester groups.

Of special value are the oxdiazole compounds of the formula (3)

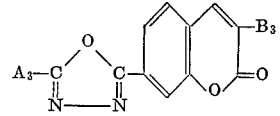

in which $A_3$ represents a residue from the series

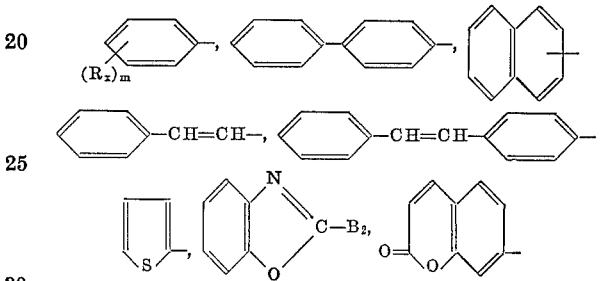

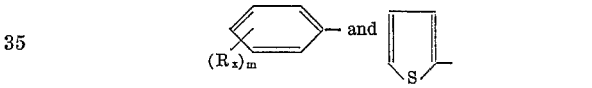

where $B_2$ has the above meaning, and $B_3$ is a residue from the series

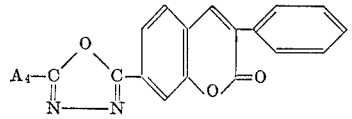

where $R_x$ represents a hydrogen atom, an alkyl group with 1 to 8 carbon atoms, an alkoxy group with 1 to 4 carbon atoms, a chlorine atom, a carboxyl group, a carboxylic acid alkyl ester group with 1 to 8 carbon atoms in the alkyl grouping, or a sulphonic acid group, and $m$ is a whole number from 1 to 5.

Of special value among the compounds of the above general formula are the oxdiazole compounds of the formula (4)

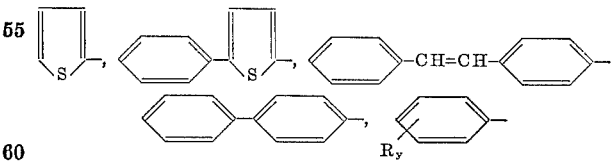

where $A_4$ represents one of the residues

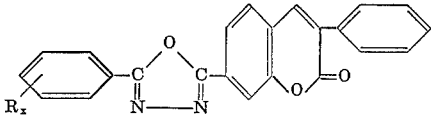

where $R_y$ is hydrogen, an alkyl radical with 1 to 8 carbon atoms, an alkoxy group with 1 to 4 carbon atoms or halogen. Valuable groups of compounds of Formula 3 correspond to the formula (5a)

in which $R_x$ represents a hydrogen atom, an alkyl group with 1 to 8 carbon atoms, an alkoxy group with 1 to 4 carbon atoms, a chlorine atom, a carboxyl group, a carboxylic acid alkyl ester group with 1 to 8 carbon atoms in the alkyl grouping, or a sulphonic acid group, as well as those of the formula (5b) 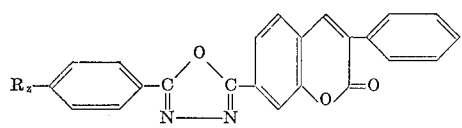

where $R_z$ represents a hydrogen atom, a phenyl group or a tertiary butyl group.

The invention further includes the use of the above-mentioned oxdiazoles—especially those of the Formulae 2 to 5—as optical brighteners for a wide variety of organic materials suitable for such optical brightening, as well as processes for optically brightening such materials, wherein these optically brightening substances are incorporated with or superficially applied to the materials concerned. The compounds of Formula 4 are particularly suitable for optically brightening substrates (especially fibrous substrates) from aromatic polyesters, synthetic polyamides and α-olefine polymers.

From the large number of compounds covered by the above definition there may be mentioned as examples the following representatives:

(6) 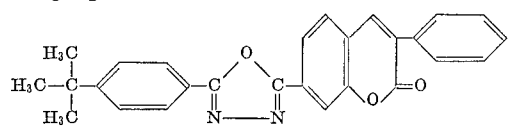

(7) 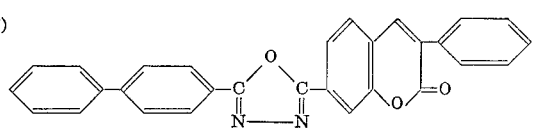

(8) 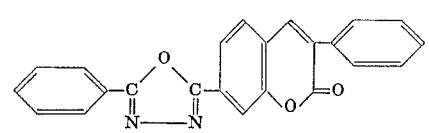

(9) 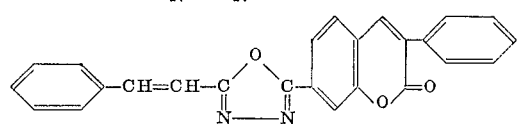

(10) 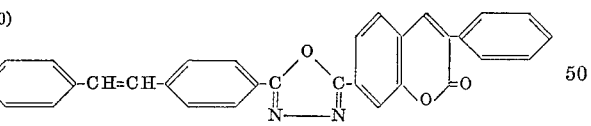

(11) 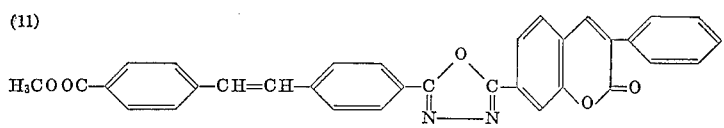

(12) 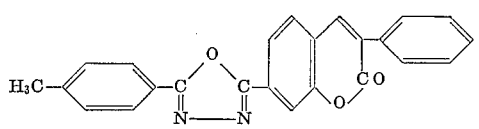

(13) 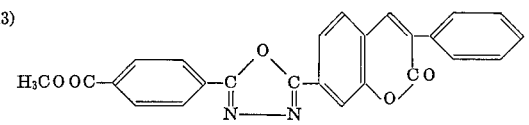

(14) 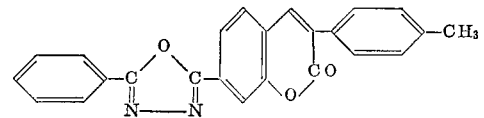

(16) (17) (18)

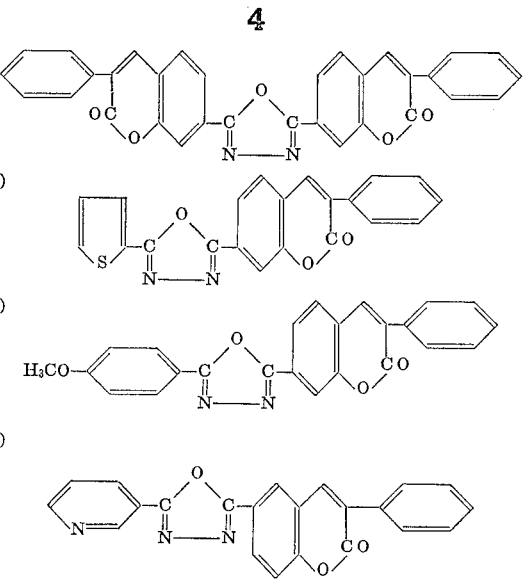

The new oxdiazole compounds of the Formula 2 may be prepared by known methods. As advantageous manufacturing processes there may be mentioned in this connection: (a) Reaction of an acid halide, especially a chloride, of the Formula 19 with a hydrazide of the Formula 20, or reaction of an acid halide, preferably a chloride, of the Formula 22 with a hydrazide of the Formula 21, to form in either case the diacylhydrazine of the Formula 23:

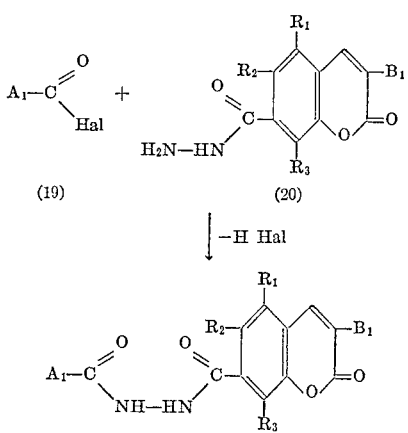

(19)    (20)

↓ −H Hal

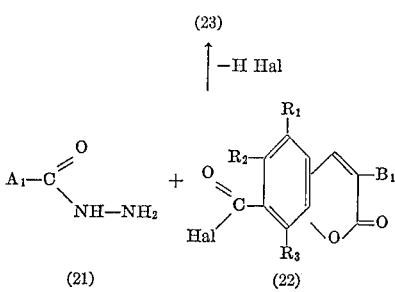

(23)

↑ −H Hal

(21)    (22)

and subsequent cyclization reaction to form 1,3,4-oxdiazole, advantageously performed with a non-sulphonating, dehydrating agent, for example thionylchloride, phosphorus oxychloride, phosphorus trichloride, phosphorus pentachloride, zinc chloride or the like.

For the manufacture of symmetrically constituted types of the Formula 2 it is, of course, possible to react 2 mols of acid halide 22 with 1 mol of hydrazine in the identical manner, or 2 mols of acid or of a corresponding alkyl ester of the formula (24)

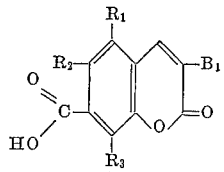

with 1 mol of hydrazine in the presence of a phosphoric acid that contains less water than orthophosphoric acid (for example polyphosphoric acid).

(b) Reaction of imidoethers upon suitable carboxylic acid hydrazides at elevated temperatures in the presence of a solvent. (In all afore-mentioned formulae the general symbols have the same meanings as in the preceding formulae.)

The reaction of the acid halide of the Formula 19 or 22 with hydrazine, hydrazine hydrate, a hydrazine salt or the carboxylic acid hydrazide of the Formula 20 or 21 to form the diacylhydrazine of the Formula 23 may be performed in the presence of a tertiary nitrogen hase at a temperature ranging from about 50 to 150° C. It is advantageous to select a tertiary nitrogen base whose boiling point is not too low, preferably one whose boiling point is at least 100° C., for example N,N-diethylaniline or N,N-dimethylaniline. Particularly good results have been obtained with cyclic tertiary nitrogen bases such as quinoline and above all pyridine bases such as pyridine itself and alkylpyridines containing a lower alkyl radical, such as 2-, 3- or 4-methylpyridine (picolines), ethylpyridines or mixtures of such pyridine bases.

Surprisingly, it has been found that the reaction leading to the acylhydrazine of the Formula 23 can be achieved in a high-boiling, inert, weakly polar to unpolar organic solvent, for example ortho-dichlorobenzene or trichlorobenzene, in the presence of the stoichiometrically needed quantity of a pyridine base, at about 50 to 150° C., whereupon the subsequent cyclization to the 1,3,4-oxdiazole can be carried out very quickly and smoothly, without intermediate isolation of the acylhydrazine, by dropping in slightly more than the stoichiometrically required quantity of thionylchloride at a temperature from 120 to 220° C., preferably at 140 to 160° C. This possibility was striking and unexpected because on the strength of the general experience in comparable cases it was to be expected that the thionylchloride would engage in uncontrollable reactions.

If desired, substituents within the scope of Formula 1b or 2 and the following formulae can be introduced into the parent compounds obtained by the present process by subsequent reactions. Thus, water-soluble derivatives are obtained when:

(a) A parent compound of the Formula 1b is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts;

(b) One or several primary or secondary amino groups of the azole derivative of the Formula 1b are converted with sultones, e.g. with propanesultone or butanesultone, at an elevated temperature into the corresponding alkylsulphonic acid derivative;

(c) One or several primary amino groups of the azole derivative of the Formula 1b are converted with aldehydebisulphite compounds e.g. with formaldehyde-alkali metal bisulphite, into the corresponding ω-methanesulphonic acid derivative;

(d) One or several primary amino groups of the azole derivative of the Formula 1b are reacted with alkylsulphonic or aralkylsulphonic acids, e.g. bromoethanesulphonic acid or benzylchloride-sulphonic acid;

(e) One or several primary or secondary amino groups or hydroxyl groups of the azole derivative of the Formula 1b are linked through s-triazin-2-yl bridges with phenolsulphonic acids or anilinesulphonic acids;

(f) In one or several hydroxyl groups of the azole derivative of the Formula 1b a polyalkylene ether chain is introduced by means of an alkylene oxide such as ethylene oxide or propylene oxide or with a polyalkylene ether monohalide;

(g) One or several groups capable of quaternation present in the azole derivative of the Formula 1b are reacted with quaternating agents e.g., methyliodide, dimethylsulphate, benzylchloride or toluenesulphonic acid alkyl esters at an elevated temperature, if necessary under superatmospheric pressure;

(h) One or several halogenoalkyl groups of the azole derivative of the Formula 1b are converted into the corresponding quaternary derivative with tertiary bases e.g. pyridine.

The new optical brighteners of the composition defined above display in the dissolved or finely dispersed state a remarkable fluorescense. They may be used for optically brightening a wide variety of organic materials of high or low molecular weight or materials containing organic substances.

As revelant examples the following groups of organic materials suitable for optical brightening may be mentioned, without thereby in any way restricting the possible scope:

(I) Synthetic organic materials of high molecular weight:

(a) Polymers based on organic compounds containing poylmerizable carbon-to-carbon double bonds, i.e. their homopolymers and copolymers and products obtained by aftertreating them, such for instance as cross-linked, grafted or decomposition products, polymer blends or the like; relevant examples are:

Polymers based on α,β-unsaturated carboxylic acids, especially of acryl compounds, of olefinic hydrocarbons (especially poly-α-olefines), polymers based on vinyl and vinylidene compounds, of halogenated hydrocarbons, of unsaturated aldehydes and ketones, of allyl compounds or the like; their graft polymerization products or cross-linked products (e.g. by means of bifunctional or polyfunctional cross-linking agents) or products accessible by partial decomposition or modification of reactive groups and the like.

(b) Other polymers accessible, for example, by ring opening e.g. polyamides of the polycaprolactam type; furthermore formaldehyde polymers or polymers accessible by polyaddition as well as by polycondensate, such as polyethers, polythioethers, polyacetals and thioplasts;

(c) Polycondensation products or precondensates based on bifunctional or polyfunctional compounds containing condensable groups, their homo- and co-condensates and products obtained by after-treating them; relevant examples are:

Polyesters, saturated (especially aromatic polyesters e.g. polyethylene terephthalate) or unsaturated (e.g. maleic acid-dialcohol polycondensates and their cross-linked products with polymerizable vinyl monomers), linear or branched (e.g. alkyd resins). Polyamides (e.g. hexamethylenediamine adipate), maleinate resins, melamine resins, phenolic resins (novolaks), aniline resins, furan resins, carbamide resins and their precondensates, and similarly constituted products, polycarbonates, silicone resins and others.

(d) Polyadducts such as polyurethanes (if desired cross-linked); epoxy resins.

(II) Semisynthetic organic materials e.g. cellulose esters or mixed esters (acetate, propionate), nitrocellulose, cellulose ethers, regenerated cellulose (viscose, cuprammonium cellulose) or products obtained by after treating them, casein plastics.

(III) Natural organic materials of animal or vegetable origin, e.g. based on cellulose or proteins such as wool, cotton, silk, bast, jute, hemp, furs and hairs, leathers, finely dispersed wood masses, natural resins (such as colophony, especially lacquer resins); furthermore rubber, gutta percha, balata and products obtained by after-treating or modifying them, decomposition products accessible by conversion of reactive groups.

The organic materials that can be optically brightened may be at any stage of their processing (raw materials, semifinished products or finished articles) and physical states. They may be in the form of structures of any desired shape, that is to say, for example, they may be predominantly three-dimensional bodies such as plates, sections, injection mouldings or components of any desired kind, chips or granulates, foamed articles; predominantly two-dimensional bodies such as films, foils, lacquers, impregnations or coatings; or predominantly unidimensional bodies such as filaments, fibres, flocks, or wires. The said materials may also be as yet not shaped and be in the most varied homogeneous and inhomogeneous forms of dispersion and physical states, for example in the form of powders, solutions, emulsions, dispersions, lactices, sols, gels, putties, pastes, waxes, adhesives, pore fillers or the like.

Fibrous materials may, for example, take the form of continuous filaments, staple fibres, flocks, hanks, yarns, fibre fleeces, felts, cottonwool, napped products or of textile fabrics or textile laminates, knitwear, of papers, cardboards, paper pulps or the like.

The compounds to be used according to this invention are also of value for the treatment of textile organic materials, especially woven textile fabrics. If fibrous substrates, such as those mentioned above, are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films or other mouldings they may be added to the moulding or injection moulding composition etc. or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the prepolymers) or a polyaddition.

The new optical brighteners are distinguished by their particularly good heat resistance and fastness to light and to migration and by their great brightening power.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may also be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formulae can also be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

When treating a number of fibrous substrates, e.g. polyester fibres, with the brighteners of this invention it is advantageous to impregnate these fibres with an aqueous dispersion of the brighteners at a temperature below 75° C., e.g. at room temperature, and then to subject it to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry treatment may follow immediately upon each other or they may be performed in a single stage.

EXAMPLE 1

A mixture of 7.98 g. of 3-phenyl-coumarin-7-carboxylic acid of the formula (25)

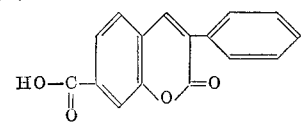

in 75 ml. of ortho-dichlorobenzene and 25 ml. of thionylchloride is heated for 3 hours at 90 to 95° C. Hydrochloric acid gas escapes and a clear solution forms. The excess thionylchloride is then evaporated under vacuum. At 50° C., the solution of the carboxylic acid chloride in ortho-dichlorobenzene is mixed with 6.4 g. of diphenyl-4-carboxylic acid hydrazide and 3 ml. of anhydrous pyridine, whereupon a thickly liquid suspension is obtained. In the course of one hour the reaction mixture is heated to 140 to 145° C., whereby a turbid solution is formed. In the course of 15 minutes at 140 to 145° C. 7 ml. of thionylchloride are dropped in, whereupon hydrochloric acid gas escapes, and the batch is stirred for 5 minutes longer at this temperature. The excess thionylchloride and the bulk of the solvent are then suctioned off under vacuum, the residue is allowed to cool to 100° C. and stirred with 100 ml. of alcohol. The precipitated crystal magma is suctioned off at room temperature, washed with alcohol and dried, to yield 9.5 g. of a yellow-beige powder melting at 260 to 264° C. Two recrystallizations from dioxane with the aid of active carbon furnish the compound of the formula (7)
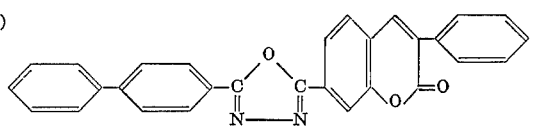

as a pale yellow, crystalline powder melting at 286 to 287° C.

*Analysis.*—$C_{29}H_{18}NO_3$, calculated: C, 78.72; H, 4.10; N, 6.33%. Found: C, 78.81; H, 4.23; N, 6.35%. Mol. weight 442.45.

The 3-phenyl-coumarin-7-carboxylic acid of the Formula 25 may be prepared thus:

A mixture of 33.2 g. of 4-carboxy-2-hydroxybenzaldehyde, 26 g. of benzylcyanide, 50 ml. of piperidine and 3 ml. of water is heated for 12 hours at 100° C. The initially dark, viscous solution gradually turns into a thick paste which is stirred with 125 ml. of glacial acetic acid, and the precipitate is suctioned off at room temperature and washed with glacial acetic acid and water.

After drying, there are obtained 37.7 g. of a light-beige powder melting at 314 to 315° C. Crystallization from dioxane with the aid of active carbon furnishes 3-phenyl-coumarin-7-carboxylic acid of the Formula 25 in the form of small, colourless needles melting at 315 to 315.5° C.

*Analysis.*—$C_{16}H_{10}O_4$, calculated: C, 72.18; H, 3.79%. Found: C, 72.32; H, 3.88%. Mol. weight 266.24.

The following 7-oxdiazolyl-coumarin compounds are accessible by a similar route:

(6)
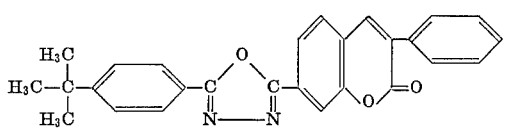

Fine, light-yellow needles from xylene, melting at 295 to 296° C.

*Analysis.*—$C_{27}H_{22}N_2O_3$, calculated: C, 76.76; H, 5.25; N, 6.63%. Found: C, 76.64; H, 5.28; N, 6.67%. Mol. weight 422.46.

(8)
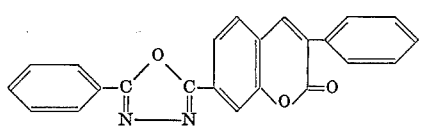

Small, yellowish needles from xylene, melting at 288 to 289° C.

*Analysis.*—$C_{23}H_{14}O_3N_2$, calculated: C, 75.40; H, 3.85; N, 7.65%. Found: C, 75.10; H, 3.87; N, 7.64%. Mol. weight 366.36.

(12)
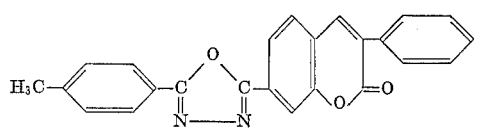

Small, pale yellowish needles from xylene, melting at 277 to 277.5° C.

*Analysis.*—$C_{24}H_{16}O_3N_2$, calculated: C, 75.78; H, 4.24; N, 7.37%. Found: C, 75.49; H, 4.16; N, 7.38%. Mol. weight 380.38.

(17)
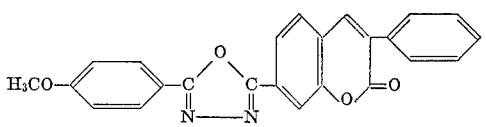

Small, yellow needles from xylene, melting at 252 to 253° C.

*Analysis.*—$C_{24}H_{16}O_4N_2$, calculated: C, 72.72; H, 4.07; N, 7.07%. Found: C, 72.56; H, 4.09; N, 6.95%. Mol. weight 396.38.

(26)
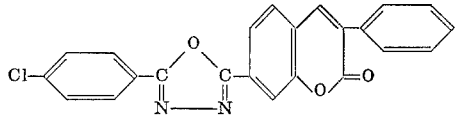

Yellowish flakes from dimethylformamide, melting at 328 to 329° C.

*Analysis.*—$C_{23}H_{13}O_3N_2Cl$, calculated: C, 68.92; H, 3.27; N, 6.99%. Found: C, 69.05; H, 3.27; N, 7.04%. Mol. weight 400.82.

(27)
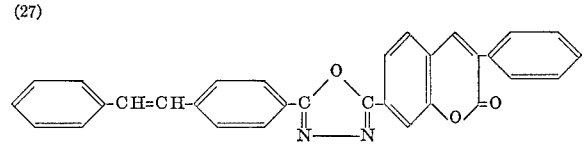

Small, yellow needles from ortho-dichlorobenzene, melting at 299 to 300° C.

*Analysis.*—$C_{31}H_{20}O_3N_2$, calculated: C, 79.47; H, 4.30; N, 5.98%. Found: 79.28; H, 4.32; N, 6.00%. Mol. weight 468.49.

(16)
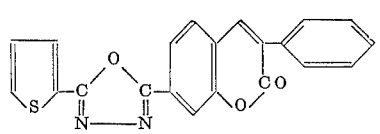

Small, yellow-beige needles from dimethylformamide, melting at 267 to 268° C.

*Analysis.*—$C_{21}H_{12}O_3N_2S$, calculated: C, 67.73; H, 3.25; N, 7.52%. Found: C, 67.85; H, 3.31; N, 7.55%. Mol. weight 372.40.

(28)
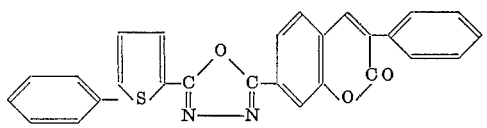

Small, yellow-beige needles from xylene, melting at 165 to 165.5° C.

*Analysis.*—C₂₇H₁₆O₃N₂S, calculated: C, 72.31; H, 3.60; N, 6.25%. Found: C, 72.10; H, 3.57; N, 6.21%. Mol. weight 448.50.

EXAMPLE 2

100 grams of polyester granulate from terephthalic acid ethyleneglycol polyester are intimately mixed with 0.05 g. of the compound of the Formula 6 or 7 and fused at 285° C. while being stirred. After spinning through conventional spinnerets strongly brightened polyester fibres are obtained.

If desired, the Compound 6 or 7 may alternatively be added to the starting materials before or during the polycondensation leading to the polyester.

EXAMPLE 3

10 kilograms of a polyamide in chip form, prepared in known manner from hexamethylenediamine adipate, are mixed with 30 g. of titanium dioxide (rutile modification) and 2 g. of the compound of the Formula 6 or 7 for 12 hours in a tumbler. The chips treated in this manner are then fused in a boiler, from which the atmospheric oxygen has been scavenged with superheated steam and which is heated at 300 to 310° C. by means of oil or diphenyl vapour, and the melt is stirred for half an hour and then expressed through a spinneret under a nitrogen pressure of 5 atmospheres (gauge). The filament spun in this manner is then cooled and wound on a spinning bobbin. The resulting filaments display an excellent brightening effect.

When a polyamide from ε-caprolactam is used instead of the polyamide from hexamethylenediamine adipate, similar, good effects are obtained.

EXAMPLE 4

A bleached fabric from polyamide staple fibre (nylon spun) is treated at a goods-to-liquor ration of 1:30 for 30 minutes at 90 to 95° C. in a bath containing, referred to the weight of the fibre material, 0.1% of the compound of the Formula 6 or 7 and 1% of acetic acid of 40% strength as well as 1% of an adduct from 35 mols of ethylene oxide and 1 mol of octadecyl alcohol. After having been rinsed and dried, the fabric treated in this manner displays an outstanding brightening effect.

When the fabric from polyamide staple fibre is replaced by a fabric from polyamide filament, similar, good brightening effects are obtained.

EXAMPLE 5

A polyester fabric (for example "Dacron") is padded at room temperature (about 20° C.) with an aqueous dispersion containing per litre 0.1 g. to 1 g. of the oxidazolyl compound of the Formula 6 or 7 as well as 1 g. of an adduct from about 35 mols of ethylene oxide and 1 mol of octadecyl alcohol, and the fabric is then dried at about 100° C. The dry material is then subjected for 30 seconds to a heat treatment at 220° C. The polyester fabric treated in this manner has a substantially higher white content than the untreated fabric had.

EXAMPLE 6

Polyvinylchloride fibres ("Thermovyl") are treated at a goods-to-liquor ratio of 1:40 for one hour at 80 to 90° C. with 0.02% of the compound of the Formula 7 in a bath which contains per litre 2 g. of an adduct from about 35 mols of ethylene oxide and 1 mol of octadecyl alcohol. The fibre material is then rinsed and dried. The polyvinylchloride fibres treated in this manner have a substantially higher white content than the untreated fibres had.

EXAMPLE 7

100 grams of polypropylene (fibre grade) are intimately mixed with 0.8 g. of the Compound 7, 8 or 12 and then fused at 280 to 290° C. while being stirred. The melt is then expressed by the known melt spinning process through conventional spinnerets and stretched. Strongly brightened polypropylene fibres are obtained.

What is claimed is:

1. New oxidazole compounds, which correspond to the formula

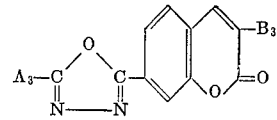

where A₃ represents a member selected from the group consisting of

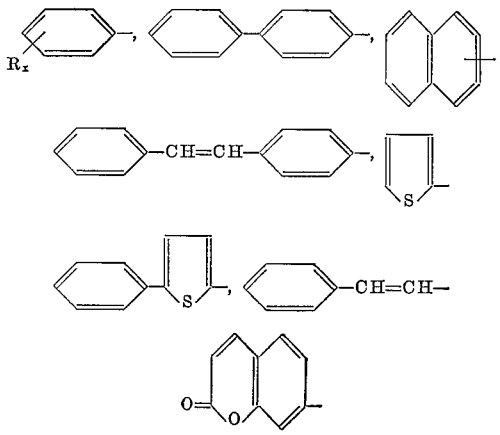

and B₃ represents a phenyl group

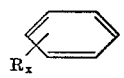

wherein $R_x$ stands for hydrogen, an alkyl group with 1 to 4 carbon atoms, an alkoxy group with 1 to 4 carbon atoms, chlorine or a carboxylic acid alkyl ester group with 1 to 4 carbon atoms in the alkyl grouping.

2. New oxdiazole compounds according to claim 1, which correspond to the formula

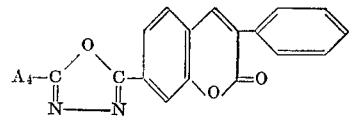

in which A₄ represents a member selected from the group consisting of

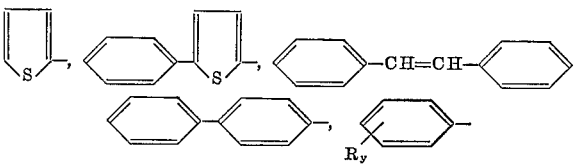

in which $R_y$ is hydrogen, alkyl with 1 to 4 carbon atoms, alkoxy with 1 to 4 carbon atoms or chlorine.

3. New oxdiazole compounds according to claim 1, which correspond to the formula

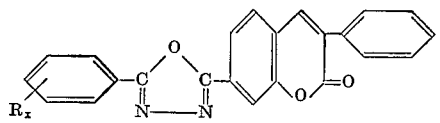

where $R_x$ represents hydrogen, an alkyl group with 1 to 4 carbon atoms, an alkoxy group with 1 to 4 carbon atoms, chlorine or a carboxylic acid alkyl ester group with 1 to 4 carbon atoms in the alkyl grouping.

4. New oxdiazole compounds according to claim 1, which corresponds to the formula
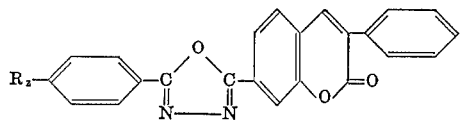
where $R_z$ represents a hydrogen atom, a phenyl group or a tertiary butyl group.
References Cited
UNITED STATES PATENTS
3,300,509   1/1967   Weber _____ 260—307
ALEX MAZEL, *Primary Examiner.*
R. V. RUSH, *Assistant Examiner.*
U.S. Cl. X.R.
106—176; 252—300; 260—137, 141, 240, 240.9